United States Patent [19]
Burke

[11] 4,421,330
[45] Dec. 20, 1983

[54] ANTIFRICTION FLUID SEAL ASSEMBLY

[75] Inventor: John A. Burke, Rocky River, Ohio

[73] Assignee: Greene, Tweed & Co., Inc., North Wales, Pa.

[21] Appl. No.: 346,701

[22] Filed: Feb. 8, 1982

[51] Int. Cl.³ .............. F16L 17/00; F16L 21/08; F16J 15/32
[52] U.S. Cl. ................... 277/188 R; 277/27; 277/152; 277/165; 277/177
[58] Field of Search .............. 277/27, 152, 153, 142, 277/143, 165, 176, 177, 188 A, 188 R

[56] References Cited

U.S. PATENT DOCUMENTS

| | | | |
|---|---|---|---|
| 3,716,245 | 2/1973 | Turolla | 277/176 |
| 3,765,690 | 1/1971 | Sievenpiper | 277/177 X |
| 4,229,013 | 10/1980 | Burke et al. | 277/188 R |
| 4,268,045 | 5/1981 | Traub | 277/121 |

Primary Examiner—Stuart S. Levy
Assistant Examiner—Lloyd Doigan
Attorney, Agent, or Firm—Panitch, Schwarze, Jacobs & Nadel

[57] ABSTRACT

A two-stage fluid seal assembly is provided for sealing between relatively moving parts, such as a piston and cylinder. The assembly comprises a hard-sealing, non-resilient material effective at high pressure and a resilient soft-sealing material effective at low pressures.

5 Claims, 5 Drawing Figures

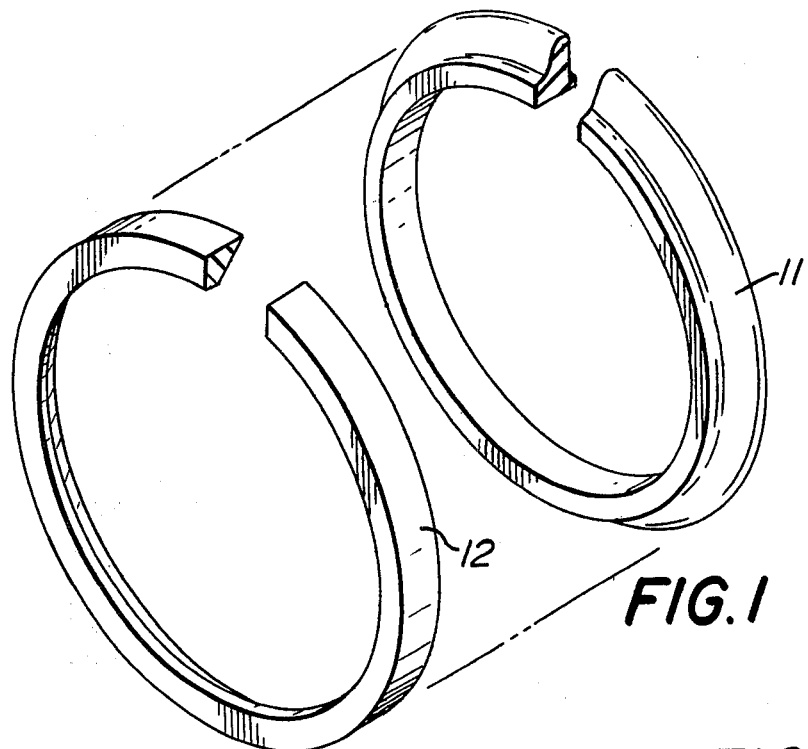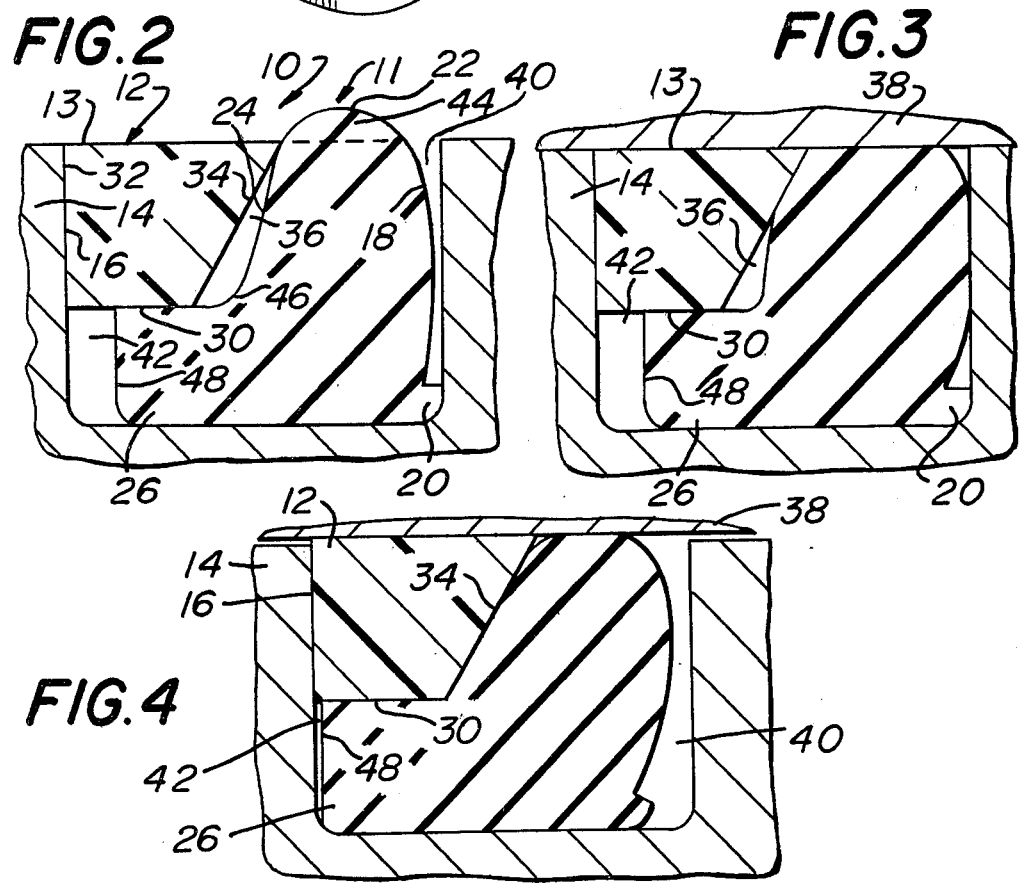

ANTIFRICTION FLUID SEAL ASSEMBLY

BACKGROUND

Conventional single-stage seals, providing a single barrier against fluid leakage, are generally unsuitable for operation over wide ranging pressures. High pressure seals composed of single resilient rings tend to extrude into the clearance between piston and cylinder. Fluid under pressure can seep between the seal and the members which it engages. Extrusion can be cured by using relatively hard-sealing, non-resilient rings. However, non-resilient rings must be installed tightly for effectiveness at high pressures. Consequently, they are unsuited for use at low pressure, causing undue friction and wear.

The solution to the problem is a two-stage assembly comprising a sealing ring of resilient deformable material effective at low pressure (100–300 psi) and a mating back-up ring responsive at high pressure (500 psi or greater), which is composed of a slightly resilient material such as virgin or loaded TEFLON. The sealing ring engages the opposing relatively-reciprocating member forming a seal at low pressure. At higher pressures, the more resilient sealing ring will pull away from the relatively-reciprocating member and radially urge the back-up ring into tight-sealing contact with that member. The result is a sealing assembly effective at low and high pressures, without causing excessive friction and wear at low pressures.

SUMMARY OF THE INVENTION

In accordance with the present invention, a seal assembly for use between inner and outer relatively moving members is provided. The assembly includes an annular sealing ring of resilient deformable material and a mating back-up ring. The assembly is typically located in a circumferentially extending groove in the inner member. The sealing ring has a radially disposed side face which defines the pressure side of the assembly and an outer peripheral surface defined by four contiguous portions. The first portion is roughly semi-circular. The second portion is an angled surface extending from the first portion at an angle of between 10° and 40° with respect to a radius of the sealing ring. The third portion is an axially extending flange. The radial edge of this flange cooperates with a radial wall of the groove to define a roughly rectangular space. The fourth portion of the outer peripheral surface of the sealing ring is a curved surface forming the intersection between the second and third portions.

The back-up ring is trapezoidal in cross-section and radially disposed with respect to the third portion of the sealing ring. A side face of the back-up ring is angled inward between 50° and 70° with respect to the axis of the back-up ring. This side face of the back-up ring cooperates with the second and fourth portions of the outer peripheral surface of the sealing ring to define a triangular space. The apex of the triangle is on a periphery of the seal assembly.

It is an object of the present invention to provide a novel seal assembly equally effective at both high and low pressures.

Other objects and advantages are set forth hereinafter.

For the purpose of illustrating the invention, there is shown in the drawings a form which is presently preferred; it being understood, however, that this invention is not limited to the precise arrangements and instrumentalities shown.

FIG. 1 is a perspective view of the mating rings separated, with a cross-section cut out.

FIG. 2 is an axial cross-sectional view through the seal assembly mounted in a groove in a piston.

FIG. 3 is a view similar to FIG. 2, but shows the orientation of components when the outer peripheral surface of the sealing ring contacts the surrounding cylinder wall.

FIG. 4 is a view similar to FIG. 3, showing the orientation of the components when full pressure has been applied to the piston.

DETAILED DESCRIPTION

Figure 5:
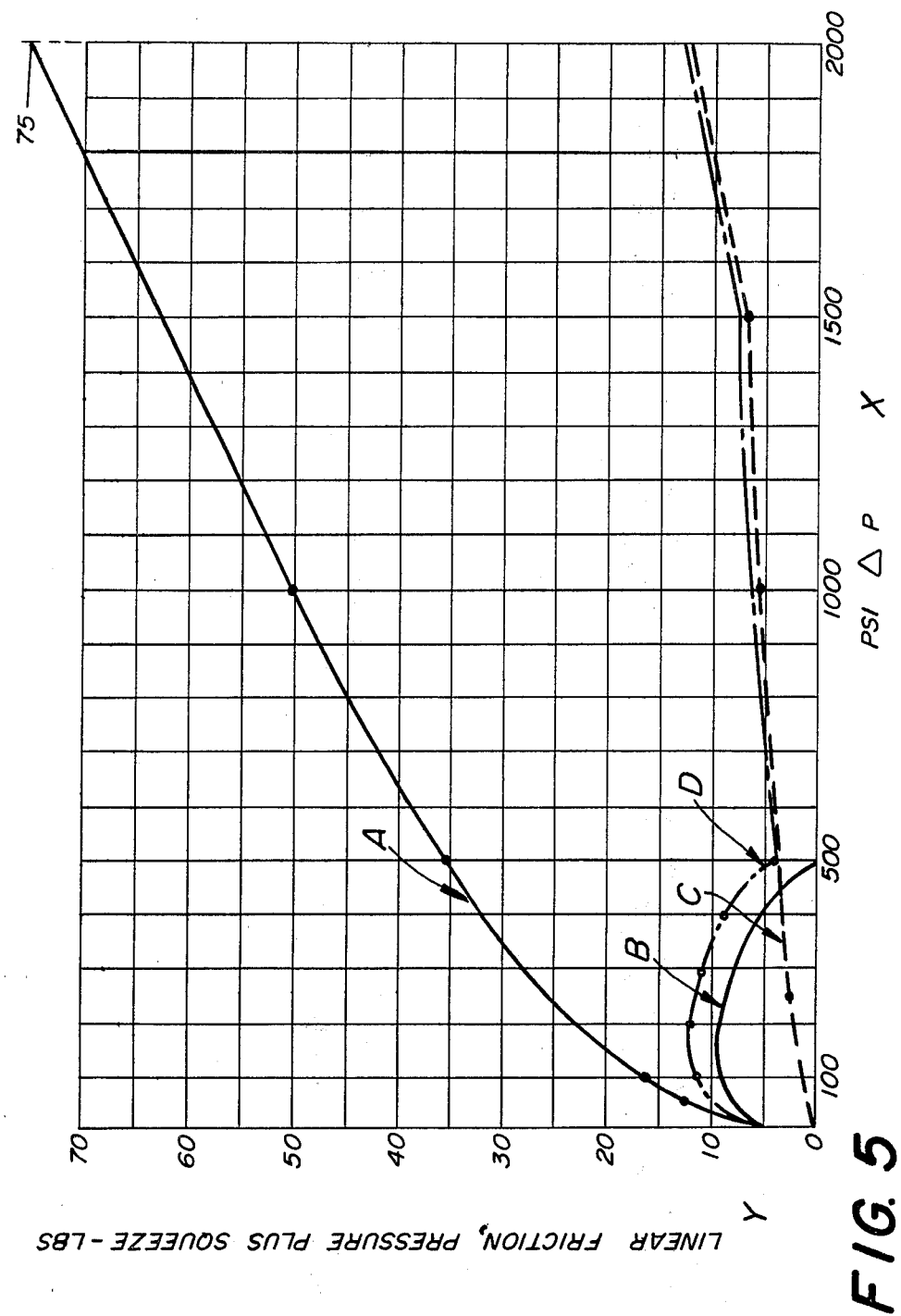
FIG. 5 is a graph of linear friction for various fluid seals versus fluid pressure.

Referring to the drawings in detail, wherein like numerals indicate like elements, FIG. 2 shows the seal assembly 10 residing in a gland or groove 16 in piston 14. The seal assembly 10 includes a sealing ring 11 and backup ring 12. Sealing ring 11 has a radially disposed side face 18 on the pressure side of the assembly. Surface 18 is the surface exposed to the pressure applied to piston 14. Contiguous with side face 18 on the pressure side of the assembly, disposed at right angles with respect to side face 18, is an axially extending flange 20. Flange 20 acts to stabilize the sealing ring 11. A space 40 is defined by side face 18, flange 20 and the wall of groove 16.

The outer periphery of the sealing ring 11 is defined by four contiguous surfaces, namely surfaces 22, 24, 46 and 30. Surface 22 as semi-circular and forms the outermost extremity of sealing ring 11. Surface 24 is contiguous with surface 22 and diverges away from surface 22 at an angle of between 10° and 40° with respect to the radius of sealing ring 11. The preferred angle is 15°. Surface 24 is contiguous with curved surface 46, which in turn is contiguous with surface 30. Surface 30 defines the outer peripheral surface of a flange 26 of the sealing ring extending axially from the non-pressure side of the assembly. Flange 26 is substantially larger than flange 20, which is located on the pressure side of the assembly.

The axial thickness of the seal assembly 10 is less than the width of groove 16, thereby leaving a rectangular space 42 on the non-pressure side of the assembly defined by the axial surface 48 of flange 26 and the wall of groove 16. The bottom corners of groove 16 may be rounded.

The back-up ring 12 is disposed radially outward from flange 26 on the non-pressure side of the assembly. Back-up ring 12 is trapezoidal in cross-section, having non-parallel side faces. A radially disposed side face 32 abuts the wall of groove 16. Angled side face 34 is angled inward between 20° and 40° with respect to the radius of back-up ring 12. The preferred angle is 30°. A triangular-shaped space 36 is defined by surfaces 24 and 46 of sealing ring 11 and angled side face 34 of back-up ring 12.

The outer diameter of sealing ring 11 is larger than that of back-up ring 12, such that projection 44 of sealing ring 11, defined by semi-circular surface 22, extends beyond the outer peripheral surface 13 of back-up ring 12. The volume of projection 44 must be less than the sum of the volumes of triangular space 36 and rectangular space 42.

When piston 14 is installed such that the seal assembly 10 contacts cylinder wall 38, sealing ring 11 deforms to the shape illustrated in FIG. 3. Sealing ring 11 has been deformed such that its surface 24 bulges into triangular space 36. Triangular space 36 shrinks but maintains a triangular shape. Side face 18 of the sealing ring bulges into space 40.

When a pressure of approximately 500 psi is applied to piston 14, sealing ring 11 deforms to the shape shown in FIG. 4. Sealing ring 11 bulges into spaces 36 and 40. This deformation of sealing ring 11 urges back-up ring 12 radially outwardly into sealing engagement with cylinder wall 38. Triangular space 36 has disappeared while space 40 on the pressure side of the assembly has been substantially enlarged. Space 42 is now very small. When low pressure is restored, the seal assembly returns to the configuration shown in FIG. 3.

The sealing ring should be composed of a significantly softer material than the back-up ring. The workable range of hardness is from about 60 to 90 durometer. The preferred material for sealing ring 11 is a resilient rubber. The back-up ring 12 should be composed of a low-friction material which is not rock hard, but rather slightly resilient. Virgin or loaded polytrifluoroethylene, sold commercially as TEFLON, is especially well-suited for back-up ring 12.

FIG. 5 is a graph of linear friction for various fluid seals versus fluid pressure. Friction is expressed in lbs. axial drag for a 1⅜ inch diameter rod, 8/16 rms. finish. The values shown are computed from known published formulae. Plot A represents a standard rubber O ring, size −326. Plot B represents the same O ring, assuming it gradually looses contact with the rod as internal pressure increases, as would be the case with the present fluid seal invention. This plot is hypothetical, arriving at zero at 500 psi. Plot C is the friction versus pressure curve published for a TEFLON capped O ring seal assembly by Shamban Company for their "glyd ring". Plot D is the calculated resultant of Plots B and C, and represents the present invention.

While the seal assembly is illustrated in a groove on piston 14, the seal assembly could be located in a groove in the cylinder wall 38.

The present invention may be embodied in other specific forms without departing from the spirit of essential attributes thereof and, accordingly, reference should be made to the appended claims, rather than to the foregoing specification, as indicating the scope of the invention.

I claim:

1. A seal assembly for use between inner and outer relatively movable members, wherein one of the members having a circumferentially extending groove defined by spaced radial walls for retaining the seal assembly, said seal assembly comprising:
    (a) an annular sealing ring of resilient deformable material having a hardness in the range of about 60 to about 90 durometer to provide a low pressure seal, and a mating back-up ring of a low-friction material having a slight resilience to provide a high pressure seal;
    (b) said sealing ring having two radially disposed side faces, a first side face defining the pressure side of the assembly, and a second side face on the opposite side of the assembly, said second side face being defined by the radial surface of an axially extending flange of said sealing ring, said radial surface adapted to cooperate with walls of a groove to define a generally rectangular space;
    (c) said sealing ring having one of its peripheral surfaces defined by four contiguous portions, the first portion being generally semi-circular, the second portion being an angled surface extending from said first portion at an angle of between 10° and 40° with respect to a radius of said sealing ring, the third portion being an axially extending surface of said flange, and a fourth portion being a curved surface forming the intersection of said second and third portions;
    (d) said sealing ring in an unstressed condition having a radial thickness greater than the radial thickness of said back-up ring, said sealing ring having a projection extending beyond a radial edge of said back-up ring, said projection being defined by the semi-circular portion of the peripheral surface of said sealing ring;
    (e) said back-up ring being trapezoidal in cross-section and radially disposed with respect to the third portion of said sealing ring, a side face of said back-up ring being a surface angled inward between 50° and 70° with respect to the axis of said back-up ring and cooperating with the second and fourth portions of said sealing ring to define a triangular space, with the apex of the triangular space being on a periphery of said assembly;
    (f) said projection of said sealing ring having a volume less than the sum of the volumes of said rectangular space and said triangular space.

2. A seal assembly in accordance with claim 1 wherein the pressure side of the sealing ring is defined by two contiguous portions, the first portion being radially disposed and the second portion being a small axially extending flange substantially smaller than the axially extending flange on the non-pressure side of the assembly.

3. A seal assembly in accordance with claim 1 wherein a piston engages a cylinder wall at high pressure, said piston containing a circumferentially extending groove retaining said assembly, said sealing ring deforming in the direction of applied pressure so as to substantially fill said rectangular space and completely fill said triangular space causing it to disappear, thereby urging said back-up ring radially inward into sealing contact with said cylinder wall.

4. A seal assembly in accordance with claim 1 wherein the sealing ring is composed of rubber and the back-up ring is composed of TEFLON.

5. A seal assembly in accordance with claim 1 wherein the efffectiveness of said low pressure seal is less than about 300 psi and the effectiveness of said high pressure seal is at least about 500 psi.

* * * * *